United States Patent

[11] 3,624,458

[72] Inventors John D. Howell
　　　　　　　Lake Park, Fla.;
　　　　　　　Stanley L. Krasienko, Indianapolis, Ind.
[21] Appl. No. 880,393
[22] Filed Nov. 26, 1969
[45] Patented Nov. 30, 1971
[73] Assignee P. R. Mallory & Co., Inc.
　　　　　　　Indianapolis, Ind.
　　　　　　　Continuation-in-part of application Ser. No.
　　　　　　　721,234, Apr. 15, 1968, now Patent No.
　　　　　　　3,515,951, dated June 2, 1970. This
　　　　　　　application Nov. 26, 1969, Ser. No.
　　　　　　　880,393

[54] CAPACITOR HAVING A GLASS-TO-METAL SEAL
　　　AND AN ELASTOMERIC SEAL
　　　15 Claims, 6 Drawing Figs.
[52] U.S. Cl. .................................. 317/230,
　　　　　　　　　　　　　　　　　　　　29/570
[51] Int. Cl. ................................... H01g 9/06,
　　　　　　　　　　　　　　　　　　　　H01g 9/10
[50] Field of Search .......................... 317/230,
　　　　　　　　　　　　　　　　　　　　231, 232, 233

[56] References Cited
UNITED STATES PATENTS
| | | | |
|---|---|---|---|
| 3,131,337 | 4/1964 | Clement | 317/230 |
| 3,243,668 | 3/1966 | Diggens | 317/230 |
| 3,264,708 | 8/1966 | Diggens | 317/230 |
| 3,275,901 | 9/1966 | Merritt et al. | 317/230 |
| 3,301,270 | 1/1967 | Horn | 317/230 |
| 3,515,951 | 6/1970 | Howell et al. | 317/230 |

Primary Examiner—James D. Kallam
Attorneys—Richard H. Childress, Robert F. Meyer, Henry W. Cummings and C. Carter Ells ABSTRACT: A resilient means cooperatively associated with the glass-to-metal seal and the sidewall of the can is utilized for substantially preventing electrolyte materials including gases contained within a capacitor can having an open end closed by a glass-to-metal seal from reaching the surface or surfaces of the glass-to-metal seal and the surface or surfaces of the can which are to be connected together by soldering, welding or the like. However, the resilient means contains an opening of sufficient size to allow the electrolyte to reach the film forming metal anode riser-terminal joint to cure any defects in the dielectric oxide formed thereon.

PATENTED NOV 30 1971

3,624,458

INVENTORS
STANLEY L. KRASIENKO
JOHN D. HOWELL
BY
Henry W. Cummings
ATTORNEY

CAPACITOR HAVING A GLASS-TO-METAL SEAL AND AN ELASTOMERIC SEAL

The application is a continuation-in-part of application Ser. No. 721,234, filed Apr. 15, 1968, now U.S. Pat. No. 3,515,951 issued June 21, 1970.

The present invention relates to means for use in a hermetically sealed wet electrolytic capacitor which substantially prevents a material or materials contained within the housing of the capacitor from forming a reaction product with surfaces intended to be joined or bonded together. If a reaction product is allowed to be formed on the surfaces to be joined or bonded together the reaction product may hinder the joining or bonding of the surfaces thereby necessitating an additional step or steps to render the metals joinable or result in the formation of a joint which may not be a hermetic joint. The present invention also relates to a method of making the electrolytic capacitor.

Several presently available electrolytic capacitors are fabricated using a conductive metal can, having at least one open end, which serves as a housing and the cathode electrode for the capacitor. The housing contains a porous anode which may be fabricated from any suitable film-forming metal. The anode may be anodized or aged so as to form a dielectric oxide film thereon using generally accepted anodizing or ageing techniques. The anode of film-forming metal is substantially immersed in a suitable acid electrolyte solution. The open end of the can is closed by a suitable sealing means such as a gasket which is compressively retained by the open end of the can or a glass-to-metal seal seated in the open end of the can and connected thereto so as to provide a hermetic seal. The gasket has good elasticity and is substantially uneffected by the corrosive characteristic of the electrolyte solution and is extrudable to some degree so that when the open end of the capacitor is crimped, the gasket is compressed so as to conform to the contours of the can and of the crimp. It should be recognized that it is important to prevent the escape of the highly corrosive acid electrolyte solution for if the electrolyte solution does escape, it may attack and damage materials surround the capacitor. The gasket and the glass of the glass-to-metal seal both have projecting therefrom a terminal lead which is connected to the anode. The seal around the terminal lead is tight thereby providing a sealed structure. The gasket end seal does not provide a hermetic seal but is sufficient to prevent escape of the acid electrolyte solution from the housing.

Although satisfactory for its intended purpose, the gasket seal is generally unsuitable for use in capacitors where the capacitor is subjected to adverse environmental conditions such as elevated temperatures, for the gasket seal is, to a degree, porous and the electrolyte solution will, to some extent, vaporize and diffuse through the porous material of the gasket.

Reduction in the amount of electrolyte solution present within the capacitor effects the electrical characteristics of the device. Therefore, hermetic seals may be used to close the open end of the can when it is thought that the capacitor device is to be used in an environment which may adversely effect the electrical characteristics of the capacitor. When the adverse environmental condition is an elevated temperature, the hermetic seal does not prevent vaporization of the electrolyte solution, but the hermetic seal does substantially prevent the vapors of the electrolyte solution from escaping from the confines of the housing. Therefore, when the electrolyte vapor cools and condenses, substantially the same amount of electrolyte solution is present as was present before the electrolyte solution was subjected to the elevated temperature.

It has been proposed that a glass-to-metal seal using a stainless steel ring be used to close and seal the open end of the wet, electrolyte capacitor. The glass-to-stainless steel seal may include a stainless steel ring which may have several layers of metals and metal alloys so as to render the stainless steel solderable. It was found that stainless steel of the type used in the hermetic seal developed a thermal oxide film at elevated temperatures required to fabricate the glass-to-metal seal which, thermal oxide film, tended to reduce the solderability of the stainless steel. Metals and/or metal alloys are plated over the stainless steel which are not corrosively attacked by the acid electrolyte solution, which do not develop a thermal oxide film at the elevated temperatures used to form the glass-to-metal seal and which are solderable.

It was found that, on occasion, the glass-to-plated stainless steel seal tended to form a reaction product with materials within the capacitor can such as, possibly, the vapors formed by the vaporization of a small part of the acid electrolyte solution during the soldering or welding of the glass-to-plated stainless steel to the can so as to close the open end of the can. The reaction product tended to hinder the welding or soldering operation so that, on occasion, an imperfect weld or solder joint was formed thereby undermining the ability of the joint to maintain the hermetic seal.

Therefore, it is an object of the present invention to overcome the problems enumerated above.

Another object of the present invention is to provide a means and method whereby the materials contained within a can housing a wet electrolytic capacitor are prevented from forming a reaction product with a glass-to-metal seal and/or a can which hinders the connection of the glass-to-metal seal used to close the open end of a can containing the capacitor to the can.

Yet another object of the present invention is to provide a hermetically sealed capacitor including means for substantially preventing vapors from the acid electrolyte solution from forming a reaction product with a glass-to-metal seal and/or with the sidewall of the housing of the capacitor during the step of joining or bonding the glass-to-metal seal to the side wall of the capacitor can to thereby hermetically seal the capacitor.

Yet still another object of the present invention is to provide a hermetically sealed capacitor including a glass-to-metal seal and an elastomer means which efficiently and effectively deforms into the void area or areas between the glass-to-metal seal and the wall of a can during the operation of joining or bonding the glass-to-metal seal to close the open end of the housing of the capacitor.

A further object of the present invention is to provide an elastomeric means which is cooperatively associated with a glass-to-metal seal.

Another object of the present invention is to provide a hermetically sealed capacitor including means providing effective protection against acid electrolyte vapor leakage from the internal area of the capacitor containing the acid electrolyte solution during the connection of the glass-to-metal seal to the inner wall of the housing at a comparatively nominal expense.

Yet another object of the present invention is to provide a hermetically sealed liquid electrolyte capacitor.

Yet still another object of the present invention is to provide an improved hermetically sealed electronic device wherein the housing components thereof are bonded together so as to resist cracking therebetween even when subjected to widely fluctuating temperatures.

Another object of the present invention is to provide a sealing method and structure which avoids the passage of electrolyte gasses passing to the area where a glass-to-metal seal is being joined to the capacitor can.

Another object of the present invention is to provide a structure whereby after the glass-to-metal seal has been joined to the capacitor can electrolyte can penetrate to the point where the anode riser and anode terminal are joined together.

A further object of the present invention is to provide a process for joining at least two metal parts of which one of the parts is predominately stainless steel so as to provide a strong mechanical joint and to provide an hermetic seal between the metallic parts.

Yet another object of the present invention is to provide a hermetically sealed capacitor means including resilient means loosely seated in a peripheral recess or step of a glass-to-metal seal which deforms into a void area or areas when the internal pressure of the capacitor is increased so as to tightly interfit with the recess or step and the inner wall of the can used to seat the anode of the capacitor during connection of the glass-to-metal seal to the inner wall of the can.

Yet another object of the present invention is to provide a hermetically sealed capacitor including resilient means loosely seated in a peripheral recess of a glass-to-metal seal wherein said resilient means is fabricated from an elastomer material which is substantially uneffected by the corrosive characteristics of the acid electrolyte solution of the capacitor.

With the aforementioned objects enumerated, other objects will be apparent to those persons possessing ordinary skill in the art. Other objects will appear in the following description, appended claims and appended drawings. The invention relates to the novel construction, combination, arrangement and cooperation of elements as hereinafter described and more particularly as defined in the appended claims.

The appended drawings illustrate embodiments of the present invention constructed to function in an advantageous mode for the practical application of the basic principles involved in the hereinafter described invention.

Figure 5:
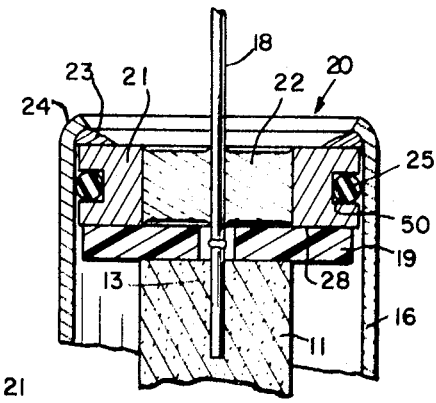
Figure 6:
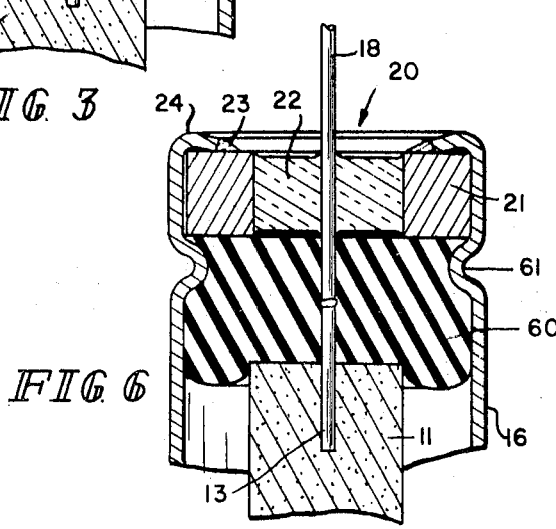

FIG. 5 is a partial cross-sectional view illustrating the resilient means loosely seated in a substantially square-shaped recess or step formed in the glass-to-metal hermetic seal; and FIG. 6 is a partial cross-sectional view of a capacitor having a crimp disposed around the can for positioning a large mass of resilient means to substantially prevent vapors of the acid electrolyte solution from forming a reaction product with the areas of the can and the glass-to-metal seal to be joined together together by soldering.

Generally speaking, the present invention relates to a resilient means normally loosely seated in a peripheral recess or stop portion of a glass-to-metal seal for an electrolytic capacitor. The resilient means is adjacent the inner sidewall of a can containing an anode of film-forming metal having a myriad of intercommunicating voids. The glass-to-metal seal is used to close the open end of the can. The resilient means deforms in response to an increase in internal pressure within the capacitor so as to tightly engage with the recess of the glass-to-metal seal and the inner wall of the can during the step of joining the glass-to-metal seal to the sidewall of the can. The deformed resilient means fills the void area or areas between the glass-to-metal seal and the can thereby substantially preventing material or materials confined within the can from coming in contact with and thereafter forming a reaction product with the portion of glass-to-metal seal which is to be soldered, welded or the like to the sidewall of the can. If the reaction product is allowed to form in the aforementioned areas, soldering, welding and the like of the glass-to-metal seal to the sidewall of the can may be hindered.

Figure 1:
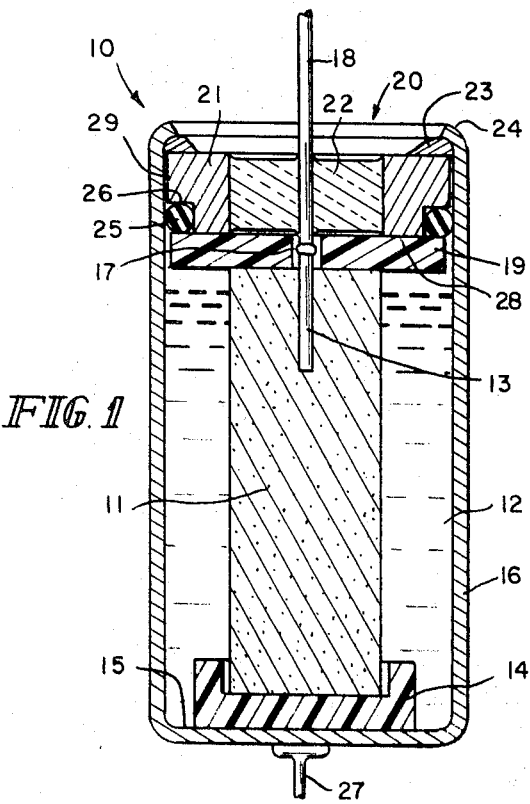
FIG. 1 is a cross-sectional view of an electrolytic capacitor incorporating the subject matter of the present invention.

An electrolytic capacitor 10 is illustrated in FIG. 1 of the drawing. The capacitor includes an anode 11 of a porous film-forming metal such as tantalum, niobium, titanium, hafnium, zirconium and the like. The porous anode may be prepared by compacting and sintering the film-forming metal powder by conventional powder metallurgy techniques. The anode includes a multiplicity of intercommunicating voids which greatly multiply the surface area with respect to the relatively small volume of the anode. An axial anode riser 13 extends from the anode and is fabricated of the same film-forming metal as the anode is itself. For example, if the anode is composed essentially of tantalum, the anode riser is composed essentially of tantalum. The anode riser may be included with the powder to be used to fabricate the anode when the anode powder is pressed and sintered or the anode riser may be formed separately from the anode and then attached to the anode.

The anode 11 is substantially immersed in an acid electrolyte solution 2. The electrolyte solution may be of any several different acid electrolyte solutions such as sulfuric acid, hydrochloric acid and the like which conducts ions between the electrodes of the capacitor and which is capable of forming a metal oxide film on the surface of the anode when the anode is subjected to a positive potential with respect to the electrolyte solution. Of the several acceptable electrolyte solutions, a sulfuric acid electrolyte solution having a concentration of about 39 percent by weight sulfuric acid is preferred.

The anode 11 may be supported by an insulating cuplike means 14 which may be fabricated from a suitable material such as fluorocarbon copolymer material which includes polytrifluorochloroethylene and polytetrofluroethylene and the like. The inner diameter of the cuplike means, in which the anode is supported, may slightly exceed the outer diameter of the anode so as to permit the acid electrolyte solution 12 to remain in contact with the portion of the longitudinal surface of the anode contained within the cuplike means. The cuplike means 14, in turn, is supported by the closed end 15 of the can 16. The can constitutes the cathode of the completed capacitor. The can or container 16 may be fabricated from a highly conductive metal such as any metals in the group consisting of copper, silver, gold, aluminum, tinned copper and the like. Of the several metals which may be used to fabricate the can, silver is preferred.

A conductive metal terminal lead 18 of the same film-forming metal as the anode riser and the anode may be butt or lap welded to the anode riser as shown at 17. The terminal lead may extend axially from the open end of the container. The axial terminal load serves as the positive terminal lead for the completed capacitor. An apertured spacer 19 is so positioned so as to circumscribe the tantalum riser and the axial terminal lead in the vicinity of the butt weld. The spacer may be fabricated from a suitable material such as a fluorocarbon copolymer material which includes polytetraflurorethylene, polytrifluorchloroethylene and the like.

Another conductive metal terminal 27 may be butt welded, soldered and the like to the exterior surface of the closed end of the container. The terminal lead may extend axially from the closed end of the can. It should be noted, however, that the terminal lead need not be connected to the housing of the capacitor since the can itself may function as the cathode terminal of the capacitor thereby eliminating the use of a cathode terminal lead.

A glass-to-metal hermetic seal 20 is shown as substantially closing the open end of the can 16. The glass-to-metal seal includes a metal ring 21 substantially circumscribing a glass annulus 22 and is soldered, welded or the like at 23 to the bent over edge portion 24 of the can 16.

A suitable glass for use as the glass portion of the glass-to-metal seal may contain the following constituents by weight: about 28—38 percent silicon, about 20–23 percent sodium, about 4–5 percent potassium, about 10–12 percent barium and the remainder oxygen with traces of lead, chromium, lithium, copper and tin.

The metal ring portion of the glass-to-metal seal may consist essentially of a metal or metals which are not adversely effected by the corrosive action of the acid electrolyte solution. Of several possible metals, stainless steel is preferred. If stainless steel is used, a suitable stainless steel consists essentially of about 2 percent by weight manganese, about 1 percent by weight silicon, 19–21 percent by weight chromium, about 30–38 percent by weight nickel, about 2–3 percent by weight molybdenum, about 3–4 percent by weight copper with minor additions of columbium, tantalum, phosphorus and sulfur and the remainder iron. It was found that the stainless steel formed a tenacious thermal oxide film during the fabrication of the seal which, on occasion, inhibited the soldering operation of the seal to the sidewall of the can. In order to substantially prevent the formation of the thermal oxide film, the stainless steel ring may be covered with a thin barrier layer of metal selected from the group consisting of nickel, cobalt and chromium which in turn is covered with a layer of a silver-noble alloy. The noble metal may be selected from the group consisting of gold, palladium, platinum, rhenium and osmium. If a nickel barrier layer metal is used, the nickel metal layer is about 0.0002 to 0.0004 inches thick. If an alloy of silver and gold overlays the nickel barrier, the alloys consists essentially of about 80–98 percent by weight silver, the remainder gold with minor amounts of impurities. The preferred alloy composition is about 88 percent by weight silver the remainder essentially gold with minor amounts of impurities. The resulting glass-to-metal seal does not form the tenacious thermal oxide film that the unlayered stainless steel does. The resultant seal is solderable to the can and is substantially uneffected by the corrosion characteristic of the acid electrolyte solution. However, the metals of the seal may form a reaction product with vapors of the acid electrolyte which may be produced during the step of connecting the glass-to-metal seal of the can. It is thought if a sulfuric acid solution is used as the electrolyte for the capacitor, a portion of the electrolyte may vaporize to form an oxide such as $SO_2$, and/or a sulfate such as $SO_4$ which may react with the layered metal on the stainless steel or the side wall of the can to form a reaction product which may inhibit the wetting action of the solder thereby producing an imperfect junction.

A loose fitting resilient means 25 is used in conjunction with the glass-to-metal seal so as to deform and thereby temporarily fill the void area and/or areas between the glass-to-metal seal and the periphery of the container wall adjacent the glass-to-metal seal when the internal pressure of the capacitor increases. The internal pressure of the capacitor increases during the soldering or welding step due in large measure to the vaporization of a portion of the acid electrolyte solution. The deformed resilient means substantially prevents the vapors of the acid electrolyte from coming in contact with the areas of the glass-to-metal seal and the sidewall of the can to be joined or bonded together. The prevention of the escape of the vaporized electrolyte substantially eliminates the formation of reaction products on the surface of the glass-to-metal seal and on the surface of the can to be connected to the glass-to-metal seal. The areas to be joined or bonded together remained solderable using conventional soldering techniques. It should be noted that the resilient means moves outwardly and upwardly to fill the void area or areas between the glass-to-metal seal and the wall of the can. A gasket is usually used as a compressive seal which moves or is compressed inwardly to fill void areas. Loosely seated resilient means 25 may be an O-ring like means fabricated from any suitable elastomer or resilient material such as silicone rubber, polytetrofluoroethylene, polytrifluororchloroethylene or an elastomer having a durometer of 80 or softer or the like which is not adversely effected by the corrosive characteristic of the acid electrolyte solution. The resilient means 25 may be fabricated as an integral part of the spacer 19 shown in FIG. 1 of the drawing.

Figure 4:
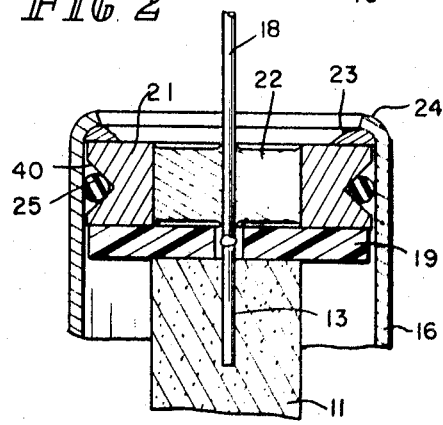
FIG. 4 is a partial cross-sectional view of the present invention illustrating the resilient means loosely seated in a substantially triangular shaped recess or step formed in the glass-to-metal hermetic seal.
Figure 3:
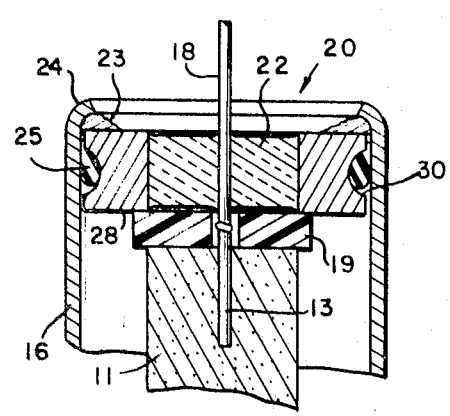
FIG. 3 is a partial cross-sectional view showing the resilient means loosely seated in a substantially semicircular recess or step formed in the glass-to-metal seal.

A notch, recess or step 26 is formed in the periphery of the ringlike metal member 21 of the glass-to-metal seal 20. The step 26 may take any of several shapes, such as a semicircularlike shape recess 30 illustrated in FIG. 3, a triangularlike shape recess 40 illustrated in FIG. 4, a squarelike shape recess 50 illustrated in FIG. 5, or the like. The recess or step may be positioned substantially at any position along the periphery 29 of the member 21. The most preferred location of the step is at the interior end surface 28 of the glass-to-metal seal so as to form a steplike recess. A rectangular-shaped step recess is shown in FIG. 1 and extends substantially 360° around the interior end surface 28 of the glass-to-metal seal 20.

The glass-to-metal seal is welded or soldered as indicated at 23. During the welding or soldering step or operation, sufficient heat may be developed so as to cause a small portion of the acid electrolyte solution to vaporize. The portion of the acid electrolyte solution which is vaporized causes the internal pressure within the capacitor device to increase. The increase in the internal pressure within the can causes the loose-fitting resilient O-ring 25 to deform in the manner indicated in FIG. 2 thereby substantially occupying the void area between the glass-to-metal seal and the sidewall of the can or container. By occupying the void area between the glass-to-metal seal and the can, the vaporized electrolyte material present, if any, is substantially prevented from finding its way to the area of the glass-to-metal seal that is to be soldered or welded to the can. By so doing, the vapors of the electrolyte are prevented from forming a reaction product such as an oxide, a sulfate, a chloride or the like with the area of the glass-to-metal seal and the can that are to be soldered, welded or the like. The soldering, welding or the like step or operation may be carried out easily and conveniently without the necessity of using an ancillary flux means to clean a reaction product from the metal portion of the glass-to-metal seal and the metal portion of the can which are to be soldered, welded or otherwise bonded together. Upon cooling of the vaporized material, the internal pressure of the capacitance device is returned to substantially normal and the expended resilient means returns to its normal position such that a tight fit does not exist between the resilient means and the inner wall of the can.

FIG. 6 shows another embodiment of the present invention. A resilient washer 60 of silicone rubber, polytriblurorchloroethylene or the like is compressively retained from longitudinal movement by the glass-to-metal seal 20 and the spacer 13. A circumferential crimp or groove 61 is formed around the outer periphery of the can to thereby exert at all times a constant force on the resilient washer to thereby compressively retain the washer in the can at all times. The compressed washer substantially prevents any vaporized acid electrolyte from coming in contact with the areas of the glass-to-metal seal and the sidewall of the can during the soldering or welding of the hermetic seal to the sidewall of the can. It should be noted that the resilient washer does not deform so as to occupy the void areas between the glass-to-metal seal and the sidewall of the can as the internal pressure within the can increases but rather occupies substantially all the area between the glass-to-metal seal and the anode. The substantially tight seal during the soldering step is achieved by compressively retaining the resilient washer in the can as indicated in FIG. 6.

It is to be noted that the embodiment in FIG. 6, while preventing vaporized electrolytes from coming in contact with areas of the glass to metal seal and the sidewall of the can during attachment of the glass-to-metal seal to the can wall, after the device is cooled down after the connection of the seal to the can it does permit electrolyte to work its way up to the joint between anode riser 13 and terminal 18. This is an important advantage because after the connection of these two members 18 and 13 for example by welding or soldering there often is an imperfect dielectric oxide film formed. However, this imperfect film can be cured by placing the device on a suitable voltage such as rated voltage and operating a capacitor for a given period of time. If desired, this can be down at elevated temperatures. Under these circumstances electrolyte does work its way up to the joint between the riser 13 and the terminal 18 and anodization takes place resulting in an improved capacitor because of the curing of the defects in the oxide film of the welded or soldered joint.

Figure 2:
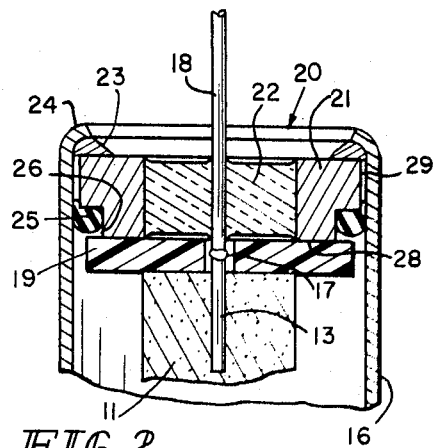
FIG. 2 is a partial cross-sectional view illustrating a normally loosely fitting resilient means deformed so as to fill the void area between the glass-to-metal seal and the sidewall of the can thereby tightly fitting with the recess or step formed in the glass-to-metal hermetic seal and the sidewall of the can.

This characteristic is also true of FIGS. 1–5 as is apparent from the drawing. In each case the spacer 19 has an opening where the welded or soldered joint such as 17 in FIGS. 1 and 2 is located. Thus the fact that capacitors of the present invention can be cured at oxide film of the joint between the anode riser and terminal constitutes an important advantage of the present invention.

The voltage usually is from about 6 to 150 volts, or higher depending on voltage rating of the capacitor, during the curing, with the temperature usually between 85° to 150° C. for a time between 1 and 48 hours. However, other voltages, times and temperatures may be utilized for some applications.

The cured anode riser terminal joint manifests itself in the following capacitor property: low DCL with substantially no possibility of increased DCL when acid reaches the terminal joint.

I claim:

1. In an electrolytic capacitor including an anode made of film-forming metal having a dielectric oxide thereon; an anode riser projecting from said anode made of the same film-forming metal as said anode also having a dielectric oxide thereon, a can having an open end and a closed end for retaining said anode and said anode riser, a liquid electrolyte solution substantially immersing said anode, and a glass-to-metal seal fixedly connected to the sidewall of said can thereby closing the open end of said can, said riser being joined to a terminal lead being made of the same film-forming metal as said anode and said riser at a joint within said capacitor below said glass-to-metal seal, a resilient means located between said seal and said anode, with said joint located within said resilient means, said resilient means contacting the inner sidewall of said can and acting to tightly fit against said inner sidewall of the can during the connecting of said glass-to-metal seal to said inner sidewall of said can, thereby substantially preventing materials in said can from forming a reaction product which hinders connection of said glass-to-metal seal to said inner wall of said can; said resilient means having an opening sufficient to permit electrolyte to reach said joint after said seal is connected to said can.

2. In the electrolytic capacitor of claim 1, wherein said resilient means includes at least in part a spacer positioned between said seal and said anode.

3. In the electrolytic capacitor of claim 3, wherein said resilient means is an elastomer means.

4. In the electrolytic capacitor of claim 3, wherein said elastomer means is selected from the group consisting of silicone rubber polytriflurochloroethylene and polytetrafluoroethylene.

5. The electrolytic capacitor of claim 2, wherein said resilient means is compressively retained between said glass-to-metal seal and said anode and said sidewall of said can.

6. A capacitor according to claim 5, wherein a groove is provided in said can between said seal and said anode to aid in compressively retaining said resilient means between said seal and said anode.

7. A method of making an electrolytic capacitor comprising:

attaching a film-forming metal terminal member having a dielectric oxide thereon, which terminal member is at least in part the metal portion of a glass-to-metal seal, to a film-forming metal anode riser having a dielectric oxide thereon, said riser being affixed to a film-forming metal anode having a dielectric oxide thereon, placing a resilient means which is at least in part between said anode and said glass-to-metal seal; said resilient means acting so as to tightly fit with the inner sidewall of a capacitor can connecting said glass-to-metal seal to said can; said resilient means having an opening of sufficient size to permit electrolyte to contact said riser-terminal joint, and cure any defects in the dielectric oxide at said joint.

8. A method of making an electrolytic capacitor comprising attaching a film-forming metal terminal member having a dielectric oxide thereon, which terminal member is at least in part the metal portion of a glass-to-metal seal, to a film-forming metal anode riser of the same film-forming method as said terminal member having a dielectric oxide thereon, said riser being affixed to an anode of the same film-forming metal as said riser and said terminal member, said riser having a dielectric oxide thereon:

placing a resilient means at least in part between said anode and said glass-to-metal seal and at least in part surrounding said joint;

connecting said glass-to-metal seal to said can, said resilient means acting to tightly fit with the inner sidewall of a capacitor can during such connection, said resilient means having an opening of sufficient size to permit electrolyte to contact said riser-terminal joint and cure any defects in the dielectric oxide at said joint after said glass-to-metal seal has been connected to said can.

9. A method according to claim 8 wherein said resilient means is an elastomer.

10. A method according to claim 9, wherein said elastomer is selected from the group consisting of silicon rubber, polytrifluorochloroethylene and polytetrofluorethylene.

11. A method according to claim 8, wherein a groove is formed in said can between said glass-to-metal seal and said anode to urge said resilient means into engagement with said glass-to-metal seal and said anode.

12. A method according to claim 8, wherein said resilient means completely surrounds said joint.

13. A method according to claim 8, including applying a sufficient voltage for a time and temperature sufficient to at least partially cure any defects in the dielectric oxide formed at said joint.

14. The method of claim 8, wherein said glass-to-metal seal is soldered to said sidewall of said can.

15. The method of claim 8, wherein said resilient means is retained between said glass-to-metal seal, said anode, and the sidewall of said can.

* * * * *